(12) United States Patent
Garcia et al.

(10) Patent No.: US 10,256,759 B2
(45) Date of Patent: Apr. 9, 2019

(54) REACTIVE POWER CONTROL SYSTEM FOR A WIND TURBINE GENERATOR

(71) Applicant: VESTAS WIND SYSTEMS A/S, Aarhus N (DK)

(72) Inventors: Jorge Martinez Garcia, Seville (ES); Naveen Kumar Boggarpu, Aarhus V (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/508,412

(22) PCT Filed: Jul. 23, 2015

(86) PCT No.: PCT/DK2015/050225
§ 371 (c)(1),
(2) Date: Mar. 2, 2017

(87) PCT Pub. No.: WO2016/034178
PCT Pub. Date: Mar. 10, 2016

(65) Prior Publication Data
US 2017/0244347 A1    Aug. 24, 2017

(30) Foreign Application Priority Data

Sep. 2, 2014   (DK) ................................. 2014 70532

(51) Int. Cl.
*H02J 3/16*      (2006.01)
*H02P 9/00*      (2006.01)
(Continued)

(52) U.S. Cl.
CPC ............ *H02P 9/006* (2013.01); *F03D 7/0284* (2013.01); *H02J 3/16* (2013.01); *H02J 3/386* (2013.01);
(Continued)

(58) Field of Classification Search
CPC .... F03D 7/0284; F05B 2270/337; H02J 3/16; H02K 7/183; H02P 9/006; H02P 9/10
(Continued)

(56) References Cited

U.S. PATENT DOCUMENTS 8,554,385 B2 * 10/2013 Donolo ..................... H02J 3/12
290/44
8,970,057 B2 *  3/2015 Li ........................... F03D 9/255
290/44

(Continued)

FOREIGN PATENT DOCUMENTS

EP        2146093 A1    1/2010
EP        2317135 A1    5/2011
(Continued)

OTHER PUBLICATIONS

International Search Report for PCT/DK2015/050225, dated Oct. 16, 2015.
(Continued)

*Primary Examiner* — Tulsidas C Patel
*Assistant Examiner* — S. Mikailoff
(74) *Attorney, Agent, or Firm* — Patterson + Sheridan, LLP

(57) ABSTRACT

The invention relates to a control system for a wind turbine generator, WTG. The control system defines reactive limits for a reactive power reference for the WTG. The reactive limits are defined as a function of a physical parameter, e.g. the output voltage of the WTG. In case the reactive power reference exceeds the predefined limits, the reactive power reference is limited. By limiting the reactive power reference output voltages which exceed certain output voltage limits may be avoided and, thereby, a disconnection of the WTG from the grid may be avoided.

16 Claims, 6 Drawing Sheets

(51) Int. Cl.
*H02J 3/38* (2006.01)
*F03D 7/02* (2006.01)
*H02K 7/18* (2006.01)
*H02P 9/10* (2006.01)

(52) U.S. Cl.
CPC ............... *H02K 7/183* (2013.01); *H02P 9/10* (2013.01); *F05B 2270/337* (2013.01); *Y02E 10/723* (2013.01); *Y02E 10/763* (2013.01); *Y02E 40/34* (2013.01)

(58) Field of Classification Search
USPC ..................................................... 290/44, 55
See application file for complete search history.

(56) References Cited

U.S. PATENT DOCUMENTS

| | | | | |
|---|---|---|---|---|
| 9,382,898 B2* | 7/2016 | Teodorescu | ........... | F03D 7/0284 |
| 2011/0156389 A1* | 6/2011 | Arlaban Gabeiras | ........................ | |
| | | | | H02J 3/1885 |
| | | | | 290/44 |
| 2013/0076037 A1* | 3/2013 | Garcia | .................. | H02J 3/1828 |
| | | | | 290/44 |
| 2014/0015250 A1* | 1/2014 | Teodorescu | ........... | F03D 7/0284 |
| | | | | 290/44 |
| 2014/0225370 A1* | 8/2014 | Mayer | ....................... | H02J 3/16 |
| | | | | 290/44 |
| 2016/0108890 A1* | 4/2016 | Garcia | .................. | F03D 1/0666 |
| | | | | 700/287 |
| 2017/0025855 A1* | 1/2017 | Garcia | ..................... | H02J 3/16 |

FOREIGN PATENT DOCUMENTS

| | | |
|---|---|---|
| EP | 2551515 A1 | 1/2013 |
| EP | 2626555 A1 | 8/2013 |
| EP | 2704282 A2 | 3/2014 |
| EP | 2711543 A1 | 3/2014 |
| WO | 2011120523 A2 | 10/2011 |
| WO | 2012083963 A1 | 6/2012 |

OTHER PUBLICATIONS

Danish Search Report for PA 2014 70532, dated Apr. 1, 2015.
Valverde Gustavo, et al.: "Reactive power limits in distributed generators from generic capability curves", 2014 IEEE PES General Meeting Conference & Exposition, IEEE, Jul. 27, 2014, pp. 1-5.

* cited by examiner

REACTIVE POWER CONTROL SYSTEM FOR A WIND TURBINE GENERATOR

FIELD OF THE INVENTION

The present invention relates to a control system for wind turbine generator, in particular to a control system configured to control generation of reactive power. Further, the invention relates to a wind turbine generator comprising the control system.

BACKGROUND OF THE INVENTION

Due to different conditions the voltage at the output terminals of the wind turbine generator (WTG) may become unacceptable low or high. Such unacceptable output voltages may be harmful for components of the wind turbine generator.

In case that the output voltage becomes too high or low the wind turbine generator may be disconnected from the grid connection to avoid damaging components of the wind turbine generator.

U.S. Pat. No. 8,710,689 discloses a wind energy installation including a rotor, a generator driven by the rotor, and a converter for generating electrical power which is output into a power supply system via a transformer. The installation also includes an open-loop control system having an open-loop converter control unit. The open-loop control system supplies an actuating signal for a reactive component to the converter. The installation further includes a voltage measurement device arranged on the transformer. The voltage signal of the voltage measurement device is applied to an input of a state-dependent setpoint value shifter, whose output signal is applied to a limitation module for the reactive component acting on the converter. With this configuration, the installation can be better protected and the transformer can be better utilized.

SUMMARY OF THE INVENTION

It is an object of the present invention to improve the control of a wind turbine generator.

It is a further object to provide an improved control system for a wind turbine generator, in particular an improved control system configured to control generation of reactive power.

In particular, it may be seen as an object of the present invention to provide a control system that solves the above mentioned problems caused by unacceptable output voltages at the output terminals of the wind turbine generator, and/or to provide a control system that avoids disconnecting of wind turbine generators from the grid.

In a first aspect of the invention there is provided a control system for a wind turbine generator, the wind turbine generator comprising a reactive power controller, the control system comprising a QV limit module configured to define predetermined reactive limits dependent on an output voltage of the wind turbine generator, wherein the QV limit module is configured to receive a reactive reference from an external source, and wherein the QV limit module is configured to output the reactive reference as an output reactive reference QrefQV and, in case the reactive reference (Qref) exceeds one of the predetermined reactive limits (302), the QV limit module is configured to determine the output reactive reference QrefQV by limiting the reactive reference Qref to the exceeded predetermined reactive limit, and wherein the reactive power controller is configured to control generation of reactive power from a power generator system of the wind turbine generator dependent on the output reactive reference QrefQV or other reactive reference being dependent on the output reactive reference QrefQV, and an update module configured to supply the predetermined reactive limit for an actual output voltage back to the external source.

Advantageously, the possible limitation of the reactive reference dependent on the output voltage of the wind turbine generator may provide better control of the output voltage so that disconnection of the wind turbine generator from the grid may be avoided. The feedback of the reactive limit to the provider of the reactive reference, i.e. the external source, may enable adaption of the reactive reference Qref based on the predetermined reactive limits for the actual output voltage.

In an embodiment the QV limit module is configured so that the predetermined reactive limits define capacitive limits setting limits for the reactive references being capacitive references and inductive limits setting limits for the reactive references being inductive references within a predefined range of the output voltage.

In an embodiment the QV limit module is configured so that the capacitive limits decreases, i.e. decreases with decreasing capacitive limit values, for increasing output voltages above a first threshold voltage.

In an embodiment the QV limit module is configured so that the inductive limits decreases, i.e. decreases with decreasing inductive limit values, for decreasing output voltages below a second threshold voltage.

In an embodiment the QV limit module is configured so that the capacitive limits comprise extended capacitive limits defining inductive values which increase for increasing output voltages above a third threshold voltage being greater than the first threshold voltage, and wherein the QV limit module is configured to set the capacitive reference Qrefcap to an inductive value according to the extended capacitive limits in case the output voltage exceeds the third threshold voltage.

In an embodiment the QV limit module is configured so that the inductive limits comprise extended inductive limits defining capacitive values which increase for increasing output voltages below a fourth threshold voltage being smaller than the second threshold voltage, and wherein the QV limit module is configured to set the inductive reference to a capacitive value according to the extended inductive limits in case the output voltage is smaller than the third threshold voltage.

In an embodiment the QV limit module is configured so that the inductive limits increase above a nominal limit Q2 for increasing output voltages above a fifth threshold voltage being greater than the third threshold voltage, and wherein the QV limit module is configured to set the inductive reference, and optionally also the capacitive reference, to one of the inductive limits above the nominal limit Q2 in case the output voltage exceeds the fifth threshold voltage.

In an embodiment the QV limit module is configured so that the capacitive limits increase above a nominal limit Q1 for decreasing output voltages below a sixth threshold voltage being smaller than the fourth threshold voltage, and wherein the QV limit module is configured to set the capacitive reference, and optionally also the inductive reference, to one of the capacitive limits above the nominal limit Q1 in case the output voltage is smaller than the sixth threshold voltage.

In an embodiment the control system further comprises a QP limit module configured to define predetermined reactive limits dependent on an active reference (active power or current reference), wherein the QP limit module is configured to limit the output reactive reference in case the output reactive reference exceeds the predetermined reactive limits of the QP limit module.

Advantageously, the series connection of the QV and QP limit modules may ensure that the reactive references is limited according to the most restrictive reactive limit dependent on the actual output voltage and the actual active power reference.

In an embodiment the update module is configured to compare the predetermined reactive limit for an actual output voltage of the QV limit module with the predetermined reactive limit of the QP limit module so as to determine the most restrictive reactive limit, and configured to supply the determined most restrictive reactive limit back to the external source.

Advantageously, the feedback of the most restrictive reactive limit to the provider of the reactive reference, i.e. the external source, may enable adaption of the reactive reference Qref based on the most restrictive predetermined reactive limit for the actual output voltage and actual active power reference.

In an embodiment the control system comprise one or more other limit modules connected in series with the QV limit module, wherein the other limit modules define predetermined reactive limits dependent on other physical parameters. The other limit modules may be configured to limit the output reactive reference QrefQV from the QV limit module in case the output reactive reference exceeds the predetermined reactive limits of the other limit modules.

Advantageously, the series connection of the QV and other limit modules may ensure that the reactive references is limited according to the most restrictive reactive limit dependent on the actual output voltage and other physical parameters, e.g. temperature.

In an embodiment the update module is configured to compare the predetermined reactive limit for an actual output voltage of the QV limit module with the predetermined reactive limit(s) of the one or more other limit modules so as to determine the most restrictive reactive limit, and configured to supply the determined most restrictive reactive limit back to the external source.

Advantageously, the feedback of the most restrictive reactive limit to the provider of the reactive reference, i.e. the external source, may enable adaption of the reactive reference Qref based on the most restrictive predetermined reactive limit for the actual output voltage and other actual physical parameters, e.g. temperature.

A second aspect of the invention relates to a wind turbine generator comprising the control system according to the first aspect.

A third aspect of the invention relates to a method for controlling a wind turbine generator, comprising the steps of
receiving a reactive reference Qref from an external source,
outputting the reactive reference Qref as an output reactive reference QrefQV, wherein, in case the reactive reference Qref exceeds one of a plurality of predetermined reactive limits (302), the output reactive reference QrefQV is determined by limiting the reactive reference Qref to the exceeded predetermined reactive limit, and wherein the predetermined reactive limits are dependent on an output voltage U_WTG of the wind turbine generator,
controlling generation of reactive power from a power generator system of the wind turbine generator dependent on the output reactive reference QrefQV or other reactive reference QrefQP being dependent on the output reactive reference QrefQV,
supplying the predetermined reactive limit for an actual output voltage back to the external source.

A fourth aspect of the invention relates to at least one computer program product directly loadable into the internal memory of at least one digital computer, comprising software code portions for performing the steps of the method according to the third aspect when said at least one product is/are run on said at least one computer.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
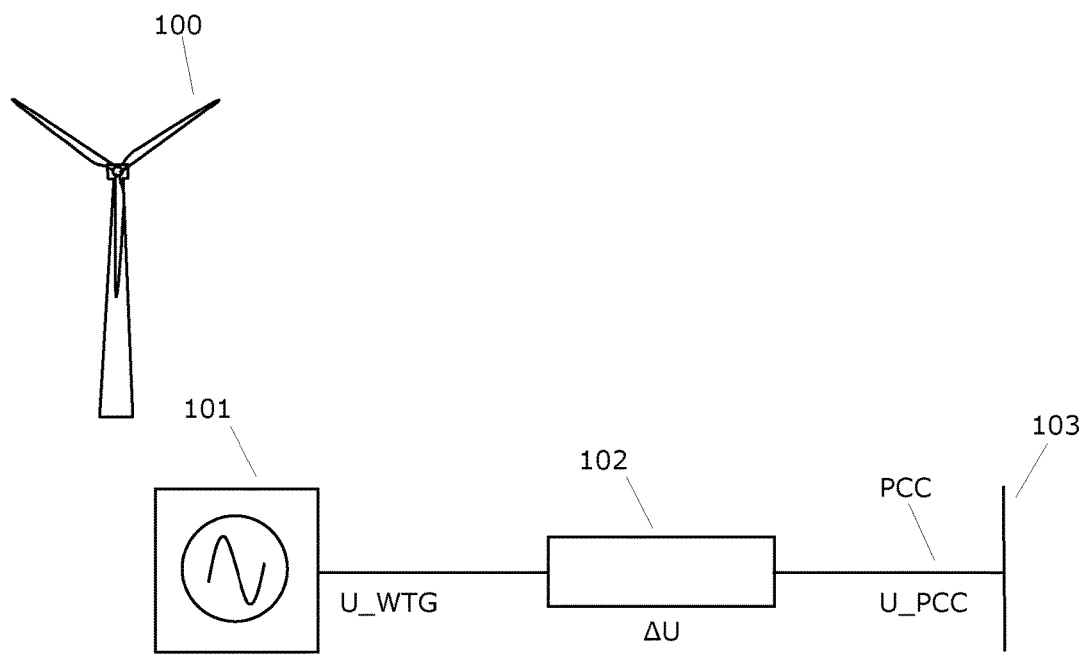
FIG. 1 illustrates a power generator system of a wind turbine generator.

FIG. 1 illustrates a power generator system 101 of a wind turbine generator 100 connected to the grid 103. The power generator system 101 may comprise a generator driven by the rotor of the wind turbine generator and a power converter configured to adjust the voltage amplitude and frequency of the generator AC voltage into a converter output AC voltage. The power generator system 101 is capable of adjusting the phase between the converter output AC voltage and the converter output AC current and, thereby, the amount of reactive and active power supplied to the grid 103.

The power generator system 101 may be connected to the grid 103 via a transformer. The reactance of the transformer, as well as the reactance of other components is included in the reactance 102. The reactive current supplied by the power generator system 101 generates a voltage drop $\Delta U$ across the reactance 102.

A resistance of the transformer and other components between the generator system 101 and the grid 103 is also present but not included in FIG. 1, i.e. is not included in the component 102 which is considered a pure reactive component. Normally, the resistive voltage drop due to the active current is smaller than the reactive voltage drop so that it can be neglected.

The voltage U_PCC at the point of common connection PCC can be considered to deviate only a few percentages from a nominal voltage.

The voltage at the output of the wind turbine generator, e.g. the voltage at the output of the power generator system 101 can therefore be described and simplified to U_WTG=ΔU+U_PCC. Since U_PCC is substantially constant (is typically only allowed to vary a few percent from a nominal value±10%), the voltage U_WTG depends mainly on the voltage drop ΔU and, thereby, on the amplitude of the reactive current supplied by the output of the wind turbine generator.

In case the reactive current or power supplied by the wind turbine generator is inductive the sign of ΔU will be negative, i.e. U_WTG will be lower than U_PCC.

In case the reactive current or power supplied by the wind turbine generator is capacitive the sign of ΔU will be positive, i.e. U_WTG will be higher than U_PCC.

In order to protect electrical components of a wind turbine generator against over or under voltages, i.e. against situations wherein U_WTG becomes too high or too low, the wind turbine generator may be configured to shut down or disconnect from the grid connection when the output voltage U_WTG becomes too high or too low.

An under voltage may case an increased generation of current from the WTG in order to maintain a required power output. The increased current may cause thermal problems. An over voltage may cause excessive loads of electrical components since internal voltages may exceed nominal design limits.

As described above, an over voltage can be induced by the WTG by injecting too much capacitive power or because the electrical grid causes a too high capacitive current flow though the reactance 102 or simply due to a transient in the system due to load operation or generator malfunction. Similarly, an under voltage can be induced by the WTG by injecting too much inductive power or because the electrical grid causes a too high inductive current flow through the reactance 102 or simply due to a transient in the system due to load operation or generator malfunction.

Figure 2:
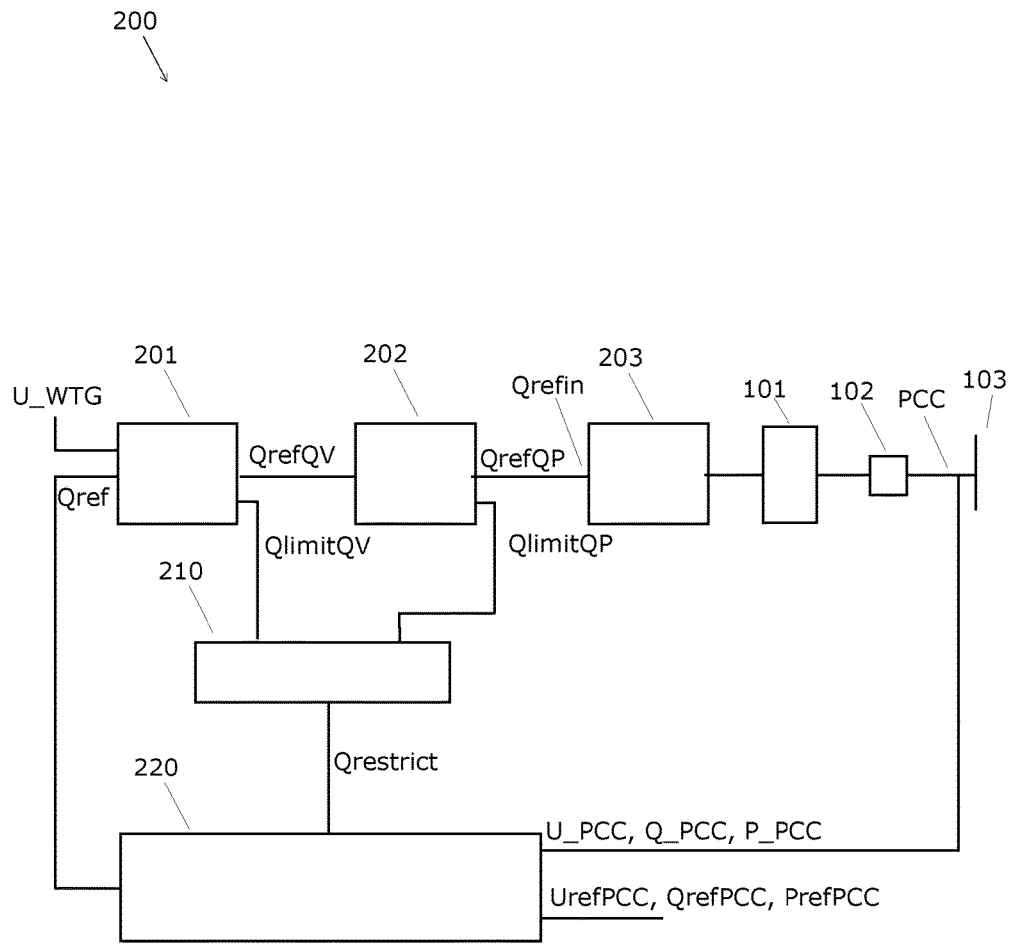
FIG. 2 illustrates a control system for a wind turbine generator.

FIG. 2 shows a control system 200 for a wind turbine generator. The control system 200 comprises a QV limit module 201 defining predetermined reactive limits dependent on an output voltage U_WTG measured at an output of the wind turbine generator, e.g. at the output of the power generator system 101.

The QV limit module 201 is configured to receive a reactive reference Qref from a power plant controller 220. In case the reactive reference Qref does not exceed the predetermined reactive limits, the reactive reference Qref is outputted unmodified as an output reactive reference QrefQV, e.g. by setting QrefQV equal to Qref. In case the reactive reference Qref does exceed the predetermined reactive limits, the output reactive reference QrefQV is determined by limiting the reactive reference Qref to the exceeded predetermined reactive limit.

The predetermined reactive limits may be configured to define both capacitive limits and inductive limits within a predefined range of the output voltage U_WTG. Thus, predetermined capacitive and inductive limits may be defined for over- and/or under voltages of the output voltage U_WTG.

Thus, predetermined reactive limits define capacitive limits setting limits for capacitive reactive references Qref and inductive limits setting limits for inductive reactive references Qref within the predefined range of the output voltage.

The predetermined reactive limits may be defined by a plurality of numerical values defined as a function the output voltage U_WTG and the reactive reference Qref, e.g. dependent on the sign of the reactive reference Qref indicating whether the reactive reference is capacitive or inductive. The predetermined reactive limits may be predetermined in the sense that the plurality of numerical values of the predetermined reactive limits are stored, e.g. as a look up table in a memory of a computer. A single predetermined reactive limit may refer to a single numerical value, e.g. a value associated with a given output voltage U_WTG (e.g. an actual output voltage) and a given reactive reference Qref.

The reactive limits may be reactive power limits, reactive current limits or other limits corresponding to reactive power or current limits. It is understood that a reactive quantity may be an inductive or capacitive quantity. Accordingly, the QV limit module 201 and other reactive limit modules 202, 401 defines predetermined reactive limits dependent on the output voltage U_WTG or dependent on other physical parameters where the reactive limits may be limits in terms of reactive power, reactive current or other parameter derivable from reactive power or reactive current. Thus, a QV limit module may be referred to as a reactive limit module.

The output reactive reference QrefQV, which may be limited or unaffected by the QV limit module, may be supplied directly to a reactive power controller 203 configured to control generation of reactive power or reactive current from the power generator system 101 of the wind turbine generator dependent on the output reactive reference QrefQV or dependent on other reactive reference which depends on the output reactive reference QrefQV.

Thus, the output reactive reference QrefQV could be supplied directly to the serially connected reactive power controller 203 or it could be supplied to another limit module such as a QP limit module 202 which defines predetermined reactive limits dependent on active power or active current, e.g. dependent on an active reference (power or current reference) or a measured active power or current generated by the power generator system 101 and wherein the QP limit module is configured to limit the output reactive reference QrefQV in case the output reactive reference exceeds one of the predetermined reactive limits of the QP limit module. Accordingly, the QP limit module 202 generates an output reactive reference QrefQP which depends on the output reactive reference QrefQV, i.e. which is unmodified or limited depending on the value of QrefQV. The active reference input or active power or current measurement input is not shown in FIG. 2.

In general the reactive power controller 203 may be configured to control generation of reactive power or reactive current dependent, at least partially, on an input reactive reference Qrefin. The control system may be configured so that the input reactive reference Qrefin is based on the output reactive reference QrefQV, e.g. Qrefin may be set equal to QrefQV, or Qrefin may be based on other reactive reference, e.g. QrefQP, which depends on the output reactive reference QrefQV, or a reactive reference QrefXX from other limit modules 401.

The power plant controller 220 may be a central controller configured to control power generation from a plurality of wind turbine generators dependent on measured electrical quantities at the point of common coupling PCC, e.g. measured voltage U_PCC, measured reactive power Q_PCC or measured active power P_PCC and corresponding references (e.g. UrefPCC, QrefPCC and PrefPCC) supplied e.g. by a grid operator system. Accordingly, the power plant controller may generate a reactive reference Qref to the wind turbine generator in order to control one of the measured electrical quantities at the PCC.

Generally, the QV limit module may be configured so that in case of an over voltage, a reactive reference Qref which is capacitive, i.e. a capacitive reference Qcapref from the power plant controller, is limited in order to avoid further voltage increases in the output voltage.

Similarly, the QV limit module may be configured so that in case of an under voltage, a reactive reference Qref which is inductive, i.e. an inductive reference Qindref from the power plant controller, is limited in order to avoid further voltage decreases in the under voltage.

The control system 200 may further comprise an update module 210 for supplying one of the predetermined reactive limits Qlimit for an actual output voltage outputted by one or more of the limit modules 201, 202, 401 back to the power plant controller. Accordingly, the predefined capacitive limit Qlimit and/or the inductive limit Qlimit for an actual output voltage U_WTG may be forwarded to the power plant controller 220 which may be configured to determine future reactive references Qref dependent on the limits forwarded by the update module 210. Accordingly, the limit modules 201, 202, 401, e.g. the QV limit module 201, may be configured to determine one of the predetermined reactive limits Qlimit for an actual output voltage, e.g. by using a recently measured output voltage U_WTG as the actual output voltage and determining the predetermined reactive limit Qlimit associated with that voltage. The predetermined reactive limit Qlimit may include either the capacitive or inductive limit, or both the capacity and inductive limits associated with a given output voltage.

The update module 210 may be configured to determine the most restrictive reactive limit Qrestrict from a plurality of limit modules including the QV module 201 and one or more other limit modules such as the QP limit module 202. Accordingly, the update module 210 may be configured to determine the smallest (here the absolute values are considered) capacitive and inductive limits among the reactive limits supplied by the limit modules 201, 202 and to forward the determined smallest reactive limits to the power plant controller 220 or external source 520. For example, the update module 210 may be configured to compare the predetermined reactive limit for an actual output voltage of the QV limit module 201 with the predetermined reactive limit(s), e.g. Qlimit_QP, of one or more other limit modules, including the QP limit module 202, so as to determine the most restrictive reactive limit, and configured to supply the determined reactive limit to the power plant controller 220. The most restrictive reactive limit may include either the capacitive or inductive limit, or both the capacity and inductive limits associated with a given output voltage.

Figure 3A:
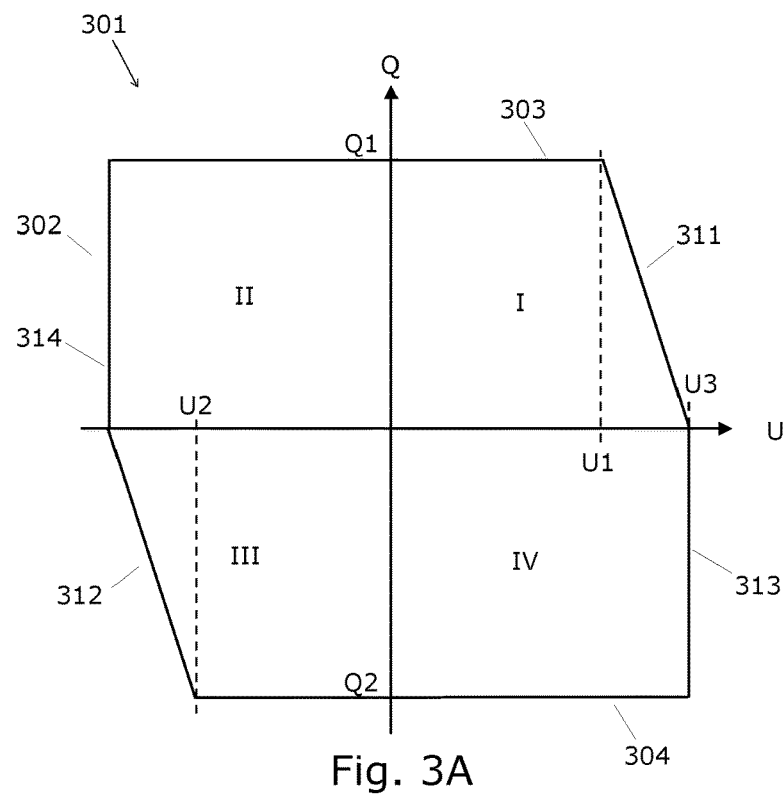
FIGS. 3A-B show examples of QV limit modules 301.
Figure 3B:
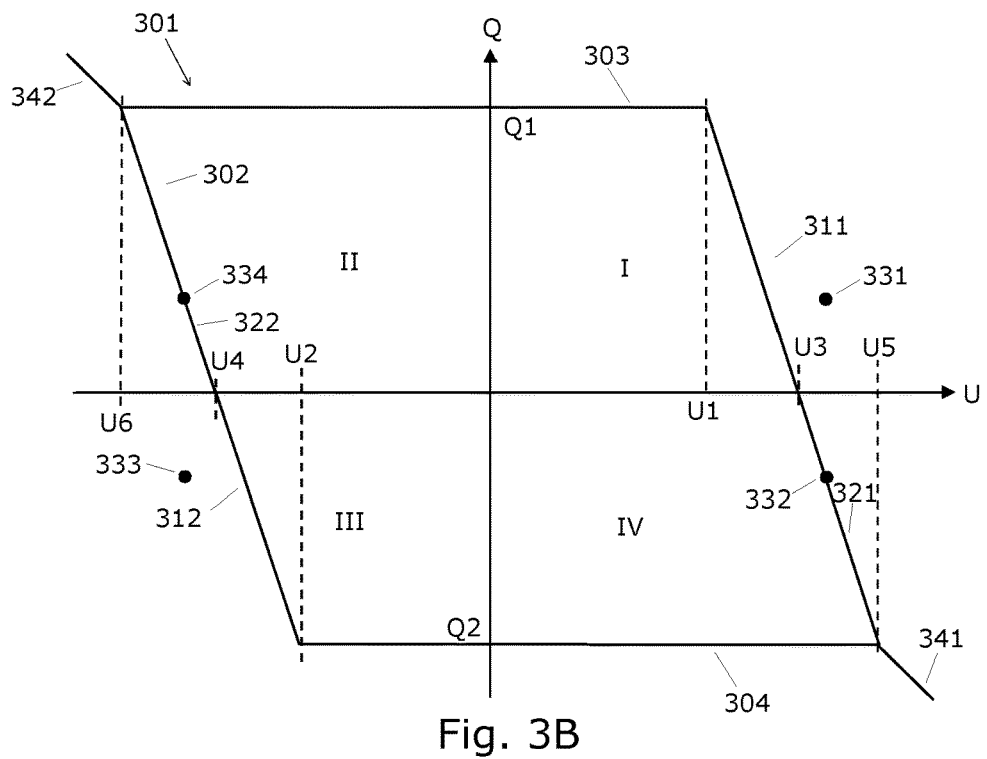

FIGS. 3A-B show examples of QV limit modules 301. The horizontal axis defines voltage values U and the vertical axis defines reactive values Q. The origin of the coordinate system defines a voltage value of one pu corresponding the nominal output voltage, and a reactive value of zero. Accordingly, values of the horizontal axis are positive, values of the vertical axis in the first and second quadrants (I, II) are positive, values of the vertical axis in the third and fourth quadrants (III,IV) are negative. Reactive values in the first and second quadrants are defined as capacitive values. Reactive values in the third and fourth quadrants are defined as inductive values. Voltages in the first and fourth quadrants are defined as over voltages since they are larger than the nominal voltage (1 pu). Voltages in the second and third quadrants are defined as under voltages since they are smaller than the nominal voltage (1 pu).

In order to avoid limitation to a specific coordinate system definition, reactive values of the coordinate system of the QV limit module, e.g. capacitive and reactive limits are considered as absolute values. I.e. inductive values in the third and fourth quadrants, which according to the coordinate system are negative, may be referred to as positive values.

The reactive values in the coordinate system may be reactive power values, reactive current values or other reactive values related to reactive power.

The predetermined reactive limits 302 comprise capacitive limits 303 in the first and second quadrants setting limits for reactive references Qref being capacitive references Qrefcap and inductive limits 304 in the third and fourth quadrants setting limits for reactive references Qref being inductive references Qrefind within a predefined range of the output voltage U_WTG along the horizontal axis.

The reactive references Qref, Qrefcap, Qrefind as well as any other reactive reference described herein may be a reference for reactive current or power. Accordingly, the predetermined reactive limits 302 may define reactive (inductive or capacitive) power or current limits for reactive (inductive or capacitive) power or current references Qref.

The reactive limits 302 define capacitive and inductive limits 303, 304 corresponding to nominal capacitive and inductive limits Q1, Q2 between a first upper threshold voltage U1 and a second lower threshold voltage U2. The nominal capacitive and inductive limits define the standard maximum reactive limits of the wind turbine generator, e.g. the standard maximum reactive powers that can be produced by the wind turbine generator.

The QV limit modules in FIGS. 3A-B comprises decreasing capacitive limits 311 which decrease for increasing output voltages U_WTG above the first threshold voltage U1. The decreasing capacitive limits 311 define decreasing capacitive values, e.g. power values. The first threshold voltage is larger than the nominal voltage U_WTG. For example, the first threshold voltage may be equal to 1.1 times the nominal voltage. The capacitive limits may decrease linearly from the nominal capacitive limit value down to zero as shown in FIGS. 3A-B. Accordingly, a capacitive reference Qref (Qrefcap) may be limited by the decreasing capacitive limits 311 in order to avoid that the over voltage increases further.

Similarly, the QV limit modules in FIGS. 3A-B comprises decreasing inductive limits 312 which decrease (i.e. the absolute value decreases) for decreasing output voltages U_WTG below the second threshold voltage U2. The decreasing inductive limits 312 define decreasing inductive values, e.g. power values. The second threshold voltage is smaller than the nominal voltage U_WTG. For example, the second threshold voltage may be equal to 0.9 times the nominal voltage. The inductive limits may decrease linearly from the nominal capacitive limit value down to zero as shown in FIGS. 3A-B. Accordingly, an inductive reference Qref (Qrefind) may be limited by the decreasing inductive limits 312 in order to avoid that the under voltage decreases further.

In case of an over voltage an inductive reference Qrefind may be limited only by the nominal inductive limits 304, e.g. up to an upper third threshold voltage U3. According to the example in FIG. 3A, for voltages above the third threshold voltage U3, the inductive reference Qref is limited to zero according to inductive limits 313.

The QV limit module in FIG. 3B differs from the QV limit module in FIG. 3A in that it comprises extended capacitive limits 321 defining inductive values which increase for increasing output voltages U_WTG above the third threshold voltage U3. The third threshold voltage is greater than the first threshold voltage U1 and may as an example be equal to 1.13, possibly 1.2 times, the nominal voltage. The capacitive limits 321 may increase linearly from zero up to the nominal inductive limit value Q2. Accordingly, for voltages above U3, a capacitive reference Qrefcap may be limited by the extended capacitive limits 321 so that a capacitive reference is turned into an inductive reference. Accordingly, the limit module 201 may be configured to set the capacitive reference Qrefcap to an inductive value according to the extended capacitive limits 321 in case the output voltage exceeds the third threshold voltage.

Since the effect of an inductive reference Qref is that the output voltage U_WTG is decreased, the extended capacitive limits 321 may help bringing the overvoltage below U3. For example, a capacitive reference at point 331 may be turned into an inductive reference at point 332. An inductive reference Qref at an output voltage above U3 is still limited to the upper nominal inductive reference Q2.

Similarly, the QV limit module in FIG. 3B differs from the QV limit module in FIG. 3A in that it comprises extended inductive limits 322 defining capacitive values which increase for increasing output voltages U_WTG below the fourth threshold voltage U4. The fourth threshold voltage is smaller than the second threshold voltage U2 and may as an example be equal to 0.87, possibly equal to 0.8, times the nominal voltage. The inductive limits may increase linearly from zero up to the nominal capacitive limit value Q1. Accordingly, for voltages below U4, an inductive reference Qrefind may be limited by the extended inductive limits 322 so that an inductive reference is turned into a capacitive reference. Accordingly, the limit module 201 may be configured to set the inductive reference Qrefind to a capacitive value according to the extended inductive limits 322 in case the output voltage exceeds the third threshold voltage.

Since the effect of a capacitive reference Qref is that the output voltage U_WTG is increased, the increasing inductive limits 322 may help bringing the under voltage above U4. For example, an inductive reference at point 333 may be turned into a capacitive reference at point 334. A capacitive reference Qref at an output voltage below U4 is still limited to the upper nominal capacitive reference Q1.

The QV limit module in FIG. 3B further may further comprise inductive limits 341 (increasing or non-increasing) which increase or remain equal to the nominal value Q2 for increasing output voltages U_WTG above the fifth threshold voltage U5. For example, the fifth threshold voltage may be equal to 1.2, possibly equal to 1.3, times the nominal voltage. The inductive limits may increase linearly from the nominal inductive limit Q2 possibly up to a given maximum value (not shown). Accordingly, for voltages above U5, an inductive reference Qrefind (optionally also a capacitive reference Qrefcap) may be limited by the inductive limits 341 defined above the nominal value Q2. Optionally, in case the reactive reference Qref is capacitive, the capacitive reference is turned into an inductive reference according to the limit function 341. Since the effect of an inductive reference Qref is that the output voltage U_WTG is decreased, the inductive limits 341 may cause injection of even higher inductive power for bringing the over voltage below U5. In case the limits 341 constitutes a linear function, the slope of the inductive limit 341 may be selected within the range from zero and upwards, e.g. up to a slope of one as shown in FIG. 3B. For a zero slope, the inductive limits 341 are equal to the nominal inductive limit Q2 for increasing output voltages U_WTG.

Accordingly, QV limit module 201 may be is configured so that the inductive limits 304 increase above a nominal limit value Q2 (or is extended with a limit equal to Q2) for increasing output voltages above the fifth threshold voltage.

The QV limit module in FIG. 3B may further comprise capacitive limits 342 (increasing or non-increasing) which increase or remain equal to the nominal value Q1 for decreasing output voltages U_WTG below the sixth threshold voltage U6. For example, the third threshold voltage may be equal to 0.83, possibly equal to 0.7, times the nominal voltage. The inductive limits may increase linearly from the nominal inductive limit Q1 possibly up to a given maximum value (not shown). Accordingly, for voltages below U6, a capacitive reference Qref (optionally also an inductive reference Qref) may be limited by the capacitive limits 342 defined above the nominal value Q1. In the optional case where the reactive reference Qref is inductive, the inductive reference is turned into a capacitive reference according to the limit function 342. Since the effect of a capacitive reference Qref is that the output voltage U_WTG is increased, the capacitive limits 342 may cause injection of even higher capacitive power for bringing the under voltage above U6. Similar to limit 341, the slope of the limits 342, i.e. the linear function defined by the limits, may be zero or greater than zero.

Accordingly, QV limit module 201 may be is configured so that the capacitive limits 303 increase above a nominal limit value Q1 (or is extended with a limit equal to Q1) for decreasing output voltages below the sixth threshold voltage.

The QV reactive limits shown in FIGS. 3A-B are examples and it is understood that the predetermined reactive limits 302 may be configured in different ways.

Figure 4:
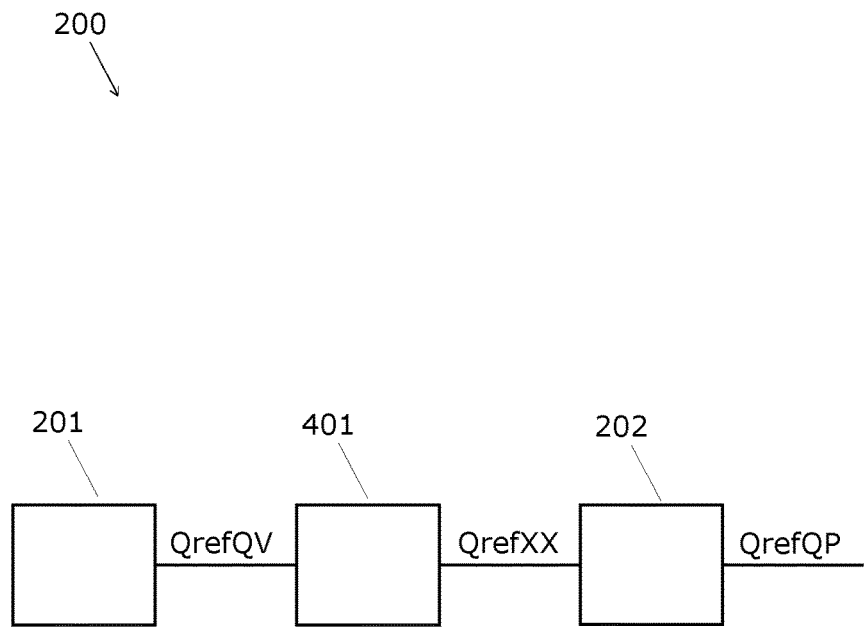
FIG. 4 illustrates an embodiment of the control system configured with one or more other limit modules.

FIG. 4 shows an embodiment of the control system 200 configured with one or more other limit modules 401, optionally the QP limit module 202, connected in series with the QV limit module. The order of the limit modules may be different than shown in FIG. 4. The other limit modules 401 define predetermined reactive limits dependent on other physical parameters such as the temperature of a WTG component (e.g. generator) and distortion in output voltage U_WTG. The other limit modules 401 are configured to limit the output reactive reference QrefQV in case the output reactive reference exceeds the predetermined reactive limit. Accordingly, a limit module may receive QrefQV from the QV limit model 201 or an output reactive reference from another limit model can generate an output reactive reference QrefXX dependent on the predefined reactive limits and the received input. The predetermined reactive limits of e.g. a QT limit module 401 which define reactive limits dependent on temperature of a WTG component may have the same capacitive and inductive limit curves as the limit curves 303, 304 in FIG. 3, but with voltage U replaced with temperature. As noted previously, the update module 210 may be configured to determine the most restrictive reactive limits from one or more of a plurality of limit modules including the QV module 201, one or more other limit module 401 and the QP limit module 202.

In the example in FIG. 2, the QV limit module receives the reactive reference Qref from the power plant controller 220 and the update module 210 supplies the reactive limits to the power plant controller 220.

Figure 5:
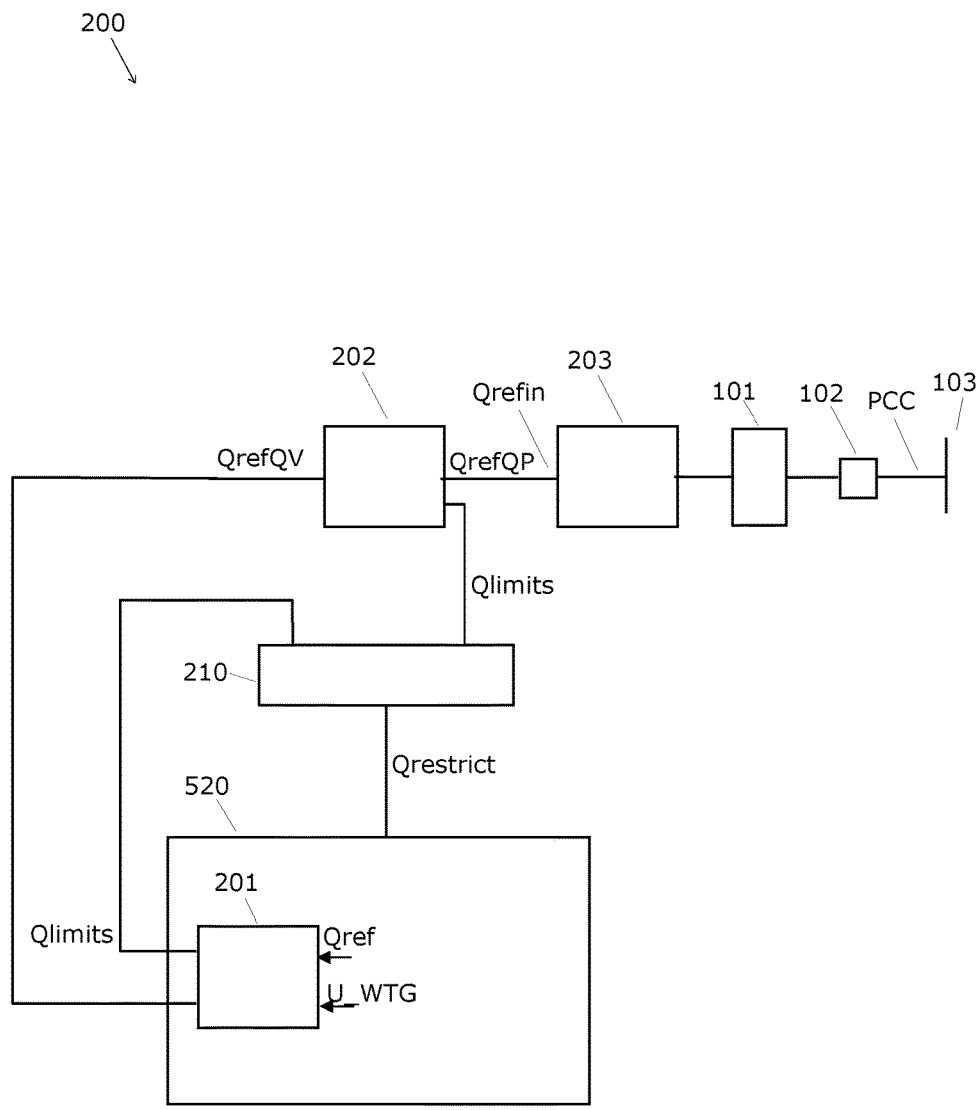
FIG. 5 illustrates an alternative control system for a wind turbine generator.

FIG. 5 shows a general configuration of the control system 500 being functionally equivalent with the control system 200, but where the QV limit module receives the reactive reference Qref from an external source 520 and the update module 210 supplies the most restrictive reactive limits to the external source 520 as a feedback signal.

Accordingly, the external source 520 may be a power plant controller 220, a grid operator or other source which is able to generate a reactive reference Qref, and possibly modify the reactive reference dependent on a feedback from the update module 210. The external source 520 is a source which normally is external to the wind turbine generator 100, i.e. which is located outside the wind turbine generator (e.g. outside the nacelle) and which supplies the reactive reference Qref to the wind turbine generator via a wired or wireless connection between the external source and the wind turbine generator.

The QV limit module 201 as well as one or more of the other limit modules 401 and the update module 210 may be comprised by the wind turbine generator 100. More generally, any one or more of the QV limit module 201, the other limit modules 401 and the update module 210 may be located externally from the wind turbine generator, e.g. they may be comprised by the external source 520, while the remaining limit modules 201, 401 may be comprised by the wind turbine generator.

Accordingly, control system 200 may be part of a wind turbine generator, an external source 520, a power plant controller 220 or the control system 200 may be distributed over different units.

FIG. 5 shows an example, where the control system 200 is distributed over the wind turbine generator and the external source 520 so that the QV limit module is comprised by the external source 520 and so that the QP limit module 202 and the update module 210 is comprised by the wind turbine generator. Accordingly, the output voltage U_WTG from the WTG is supplied to the externally located QV limit module 201. The reactive reference Qref, which may be provided by the external source 520 or other external source, is also supplied as an input to the QV limit module 201. The reactive limits for an actual output voltage Qlimits from the QV and QP limit modules 201, 202 are supplied to the update module 210 which determines the most restrictive reactive limits Qrestrict and supplies these limits to the external source 520.

Figure 6:
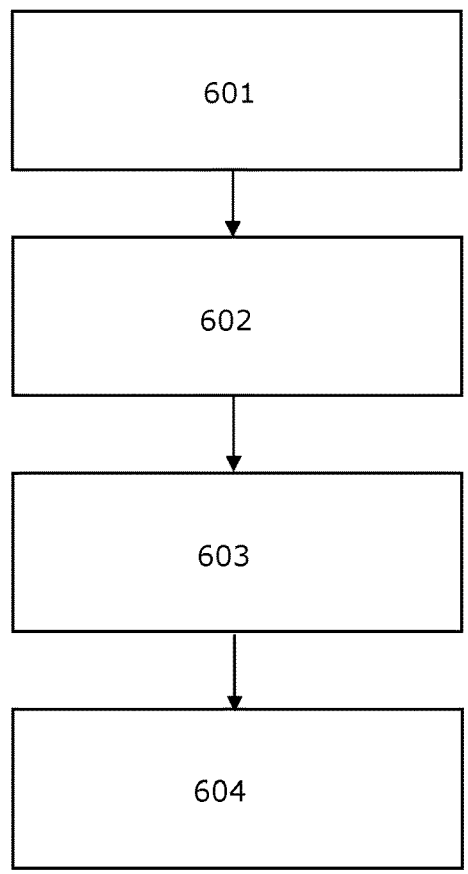
FIG. 6 illustrates a method of an embodiment of the invention.

FIG. 6 illustrates a method of an embodiment of the invention comprising the steps:
- 601: receiving a reactive reference Qref from an external source 520, 220,
- 602: outputting the reactive reference Qref as an output reactive reference QrefQV, wherein the output reactive reference QrefQV is determined by limiting the reactive reference Qref to a predetermined reactive limit 302 in case the reactive reference Qref exceeds the predetermined reactive limit 302, and wherein the predetermined reactive limit 302 is dependent on an output voltage U_WTG of the wind turbine generator,
- 603: controlling generation of reactive power from a power generator system 101 of the wind turbine generator dependent on the output reactive reference QrefQV or other reactive reference, e.g. QrefQP, being dependent on the output reactive reference QrefQV,
- 604: supplying the reactive limits for an actual output voltage back to the external source.

In summary the invention relates to a control system for a wind turbine generator (WTG). The control system defines reactive limits for a reactive power reference for the WTG. The reactive limits are defined as a function of a physical parameter, e.g. the output voltage of the WTG. In case the reactive power reference exceeds the predefined limits, the reactive power reference is limited. By limiting the reactive power reference output voltages which exceed certain output voltage limits may be avoided and, thereby, a disconnection of the WTG from the grid may be avoided.

Embodiments of invention can be implemented by means of electronic hardware, software, firmware or any combination of these. Software implemented embodiments or features thereof may be arranged to run on one or more data processors and/or digital signal processors. Software is understood as a computer program which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors. A unit may constitute a control system or subunits thereof.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A control system for a wind turbine generator, the wind turbine generator comprising a reactive power controller, the control system comprising:
   a processor; and
   a memory storing a program, which, when executed on the processor, performs an operation, the operation comprising:
   receiving an input reactive reference from an external source;
   identifying a reactive limit based on an output voltage of the wind turbine generator and the input reactive reference;
   determining that the input reactive reference exceeds the reactive limit, and in response setting an output reactive reference equal to the reactive limit;
   outputting the output reactive reference to the reactive power controller,
   wherein the reactive power controller is configured to control generation of reactive power from a power generator system of the wind turbine generator based, at least in part, on the output reactive reference; and
   providing the reactive limit to the external source.

2. A control system according to claim 1, the operation further comprising:
   determining that the input reactive reference is a capacitive reference, and in response identifying a capacitive limit as the reactive limit, wherein the reactive limit falls within a predefined range of the output voltage.

3. A control system according to claim 2, wherein the reactive limit decreases for increasing output voltages above a first threshold voltage.

4. A control system according to claim 3, wherein the reactive limit comprises extended capacitive limits defining inductive values which increase for increasing output voltages above a third threshold voltage, wherein the third threshold voltage is greater than the first threshold voltage, the operation further comprising:
determining that the output voltage exceeds the third threshold voltage, and in response setting the output reactive reference to an inductive value according to the extended capacitive limits.

5. The control system of claim 2, the operation further comprising:
determining that the output voltage has fallen below a fifth threshold voltage, and in response identifying the reactive limit as an increased capacitive limit.

6. A control system according to claim 1, the operation further comprising:
determining that the input reactive reference is an inductive reference, and in response identifying an inductive limit as the reactive limit, wherein the reactive limit falls within a predefined range of the output voltage, and wherein the reactive limit decreases for decreasing output voltages below a second threshold voltage.

7. A control system according to claim 6, wherein the reactive limit comprises extended inductive limits defining capacitive values which increase for increasing output voltages below a fourth threshold voltage, wherein the fourth threshold voltage is smaller than the second threshold voltage, the operation further comprising:
determining that the output voltage is smaller than the fourth threshold voltage, and in response setting the output reactive reference to a capacitive value according to the extended inductive limits.

8. The control system of claim 6, the operation further comprising:
determining that the output voltage is greater than a sixth threshold voltage, and in response identifying the reactive limit as an increased inductive limit.

9. A control system according to claim 1, the operation further comprising:
receiving an active reference; and
identifying a second reactive limit based on the active reference, wherein the output reactive reference is further based on the second reactive limit.

10. A control system according to claim 9, the operation further comprising:
determining a more restrictive reactive limit based on comparing the reactive limit with the second reactive limit, wherein the more restrictive reactive limit is provided to the external source.

11. The control system of claim 10, wherein the reactive limit comprises a reactive voltage limit, and wherein the second reactive limit comprises a reactive power limit.

12. The control system of claim 9, wherein the reactive limit comprises a reactive voltage limit, and wherein the second reactive limit comprises a reactive power limit.

13. A control system according to claim 1, the operation further comprising:
identifying a third reactive limit, based on a physical parameter other than output voltage of the wind turbine and the input reactive reference.

14. A control system according to claim 13, the operation further comprising:
determining a more restrictive reactive limit based on comparing the reactive limit with the third reactive limit, wherein the more restrictive reactive limit is provided to the external source.

15. A method for controlling a wind turbine generator, comprising:
receiving an input reactive reference from an external source;
identifying a reactive limit based on an output voltage of the wind turbine generator and the input reactive reference;
determining that the input reactive reference exceeds the reactive limit, and in response setting an output reactive reference equal to the reactive limit;
outputting the output reactive reference to a reactive power controller;
controlling generation of reactive power from a power generator system of the wind turbine generator dependent on the output reactive reference; and
providing the reactive limit to the external source.

16. A computer program product for controlling a wind turbine generator, the computer program product comprising:
a computer-readable storage medium having computer-readable program code embodied therewith, the computer-readable program code executable by one or more computer processors to perform an operation, the operation comprising:
receiving an input reactive reference from an external source;
identifying a reactive limit based on an output voltage of the wind turbine generator and the input reactive reference;
determining that the input reactive reference exceeds the reactive limit, and in response setting an output reactive reference equal to the reactive limit;
outputting the output reactive reference to a reactive power controller, wherein the reactive power controller is configured to control generation of reactive power from a power generator system of the wind turbine generator based, at least in part, on the output reactive reference; and
providing the reactive limit to the external source.

* * * * *